(12) United States Patent
Aravamudan

(10) Patent No.: US 8,419,871 B2
(45) Date of Patent: *Apr. 16, 2013

(54) DECORATING SURFACES

(76) Inventor: Gosakan Aravamudan, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/130,309

(22) PCT Filed: Nov. 19, 2009

(86) PCT No.: PCT/IN2009/000665
§ 371 (c)(1),
(2), (4) Date: May 20, 2011

(87) PCT Pub. No.: WO2010/070669
PCT Pub. Date: Jun. 24, 2010

(65) Prior Publication Data
US 2011/0220266 A1    Sep. 15, 2011

(30) Foreign Application Priority Data
Nov. 25, 2008 (IN) .............. 2930/CHE/2008

(51) Int. Cl.
*B44C 3/12* (2006.01)
(52) U.S. Cl.
USPC ............................................ 156/63
(58) Field of Classification Search ............ 156/63, 156/60
See application file for complete search history.

(56) References Cited

U.S. PATENT DOCUMENTS
3,451,879 A * 6/1969 Fuller ................... 428/76

FOREIGN PATENT DOCUMENTS
| | | |
|---|---|---|
| EP | 1175986 A1 | 1/2002 |
| EP | WO2006074860 A1 | 7/2006 |
| GB | 863772 A | 3/1961 |
| IT | WO2006120716 A1 | 11/2006 |

* cited by examiner

*Primary Examiner* — Khanh P Nguyen
*Assistant Examiner* — Margaret Squalls
(74) *Attorney, Agent, or Firm* — Ash Tankha; Lipton, Weinberger & Husick

(57) ABSTRACT

A method of manufacturing a decorative surface of a furniture body or building structure comprises: manufacturing a layer of an art release sheet, depositing an uncured artificial stone mix on the art release sheet, compacting, and wrapping the art release sheet around a central core. The uncured artificial stone mix is allowed to partially or fully cure, wherein the art units in the art release sheet are embedded in the artificial stone mix. The decorative surface may be manufactured by loading an art deposit frame with art particles of a predetermined quantity and size, placing and vibrating the loaded art deposit frame on a base layer to create an art unit, and depositing an uncured artificial stone mix on the base layer comprising the art unit. Pressure is applied on the uncured artificial stone mix to compact and allow the artificial stone mix to partially or fully cure.

3 Claims, 16 Drawing Sheets

DECORATING SURFACES

CROSS REFERENCE TO RELATED APPLICATIONS

This application claims the benefit of the following patent applications:
1. Provisional patent application number 2930/CHE/2008 titled "Decorating Surfaces", filed on Nov. 25, 2008 in the Indian Patent Office.
2. PCT application number PCT/IN2009/000665 titled "Decorating Surfaces", filed on Nov. 19, 2009 in the Indian Patent Office.

The specifications of the above referenced patent applications are incorporated herein by reference in their entirety.

BACKGROUND

This invention, in general, relates to furniture and building structures. More particularly, this invention relates to manufacturing a decorative surface for furniture and building structures, for example, doors, tables, flooring, windows, wall claddings etc.

Artificial stone may be used for building and furniture applications. Patent application number 2454/CHE/2008 titled "Body Structure For Furniture And Building Structures", filed on 6 Oct. 2008 in the Indian Patent Office, coauthored by the applicant refers to the use of artificial stone in door and table applications.

Conventionally art work is created on a work bench. The making of a piece of artwork takes a long time depending on the skill of the artists. Hence there is a need for preparing the art work in a remote site and creating artwork rapidly. Furthermore, the created art work needs to be transported to the work bench for integration into the artificial stone without disturbing the art work during transportation. Hence, there is an unmet need for a convenient process that enables the infusion of art into artificial stone surfaces for furniture and building structure applications.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The method disclosed herein address the above stated need for a convenient process that enables the infusion of art into artificial stone surfaces for furniture and building structure applications.

The method disclosed herein enables the manufacture of a decorative surface of a furniture body or building structure. A layer of an art release sheet is manufactured with multiple art units adhering to a surface of a base sheet. The art release sheet is manufactured by applying a binder on multiple predetermined regions, selected surfaces, or the entire surface of the base sheet. The art units are placed on the binder, whereby the art units adhere to the base sheet. The art units are, for example, one or more of ornamental glass, semiprecious stones, metal art, colored quartz, glass jewelry, stone jewelry, etc. The binder is, for example, polyvinyl alcohol. The binder may be dried at room temperature or at an elevated temperature. The art release sheet is transported to a work bench without dislodging the art units from the base sheet. The base sheet is, for example, a polyethylene terephthalate sheet, a plastic sheet, a rubber sheet, or a polytetrafluoroethylene (PTFE) sheet.

An uncured artificial stone mix is deposited on the art release sheet and compacted. A central core is placed on the art release sheet deposited with the uncured artificial stone mix. The surface of the central core comprises one or more of a planar surface, a curved surface, an uneven surface, a non uniform surface, and a combination thereof. The art release sheet with the uncured artificial stone mix is wrapped around the central core, whereby a contiguous piece of art work extending from one face of the furniture body or building structure to one or more of another surface of the furniture body or building structure is created. The artificial stone mix is allowed to partially or fully cure. The base sheet is removed after allowing the artificial stone mix to partially or fully cure. The strength of adhesion between the partially cured or the fully cured artificial stone mix and the art units is greater than the strength of adhesion between the art units and the base sheet. The art units are embedded in the cured artificial stone mix, whereby the decorative surface is manufactured.

In an embodiment, a method of manufacturing a decorative surface of a furniture body or building structure comprises: a) manufacturing an art release sheet, wherein the art release sheet comprises multiple art units placed on a surface of a base sheet; b) depositing an uncured artificial stone mix on the art release sheet and allowing the uncured artificial stone mix to partially or fully cure, whereby the art units are embedded in the cured artificial stone mix for manufacturing the decorative surface.

In another embodiment, the art release sheet with the uncured artificial stone mix is wrapped around a central core placed on the uncured artificial stone mix to create a contiguous piece of art work. The contiguous piece of art work extends from one face of the furniture body or building structure to one or more of another surface of the furniture body or building structure. The base sheet is removed after allowing the artificial stone mix to partially or fully cure.

In yet another embodiment, a method of manufacturing a decorative surface of a furniture body or building structure comprises: a) manufacturing an art deposit frame for creation of an art unit, wherein the art deposit frame comprises a cavity defined by a continuous sidewall and a wire mesh detachably attached to bottom edges of the continuous sidewall, wherein the continuous sidewall defines a periphery of the art unit; b) loading the art deposit frame with art particles of a predetermined quantity and size; c) placing the loaded art deposit frame on a base layer, wherein the base layer has a surface release property; d) vibrating the loaded art deposit frame on the base layer, thereby allowing the art particles loaded in the art deposit frame to pass through the wire mesh of the art deposit frame to create the art unit rapidly on the base layer; e) depositing an uncured artificial stone mix on the base layer comprising the created art unit; f) compacting the deposited uncured artificial stone mix and allowing the compacted artificial stone mix to partially or fully cure, whereby the created art unit on the base layer is embedded in the cured artificial stone mix for manufacturing the decorative surface.

After depositing the uncured artificial stone mix on the base layer, pressure is applied on the deposited artificial stone mix. A backing of glass fiber is applied on the deposited artificial stone mix and coated with a resin thereby providing improved strength to the furniture body. Vibro-compaction or vibro-compaction in a vacuum is applied to the artificial stone mix, whereby trapped volatiles and air are released.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
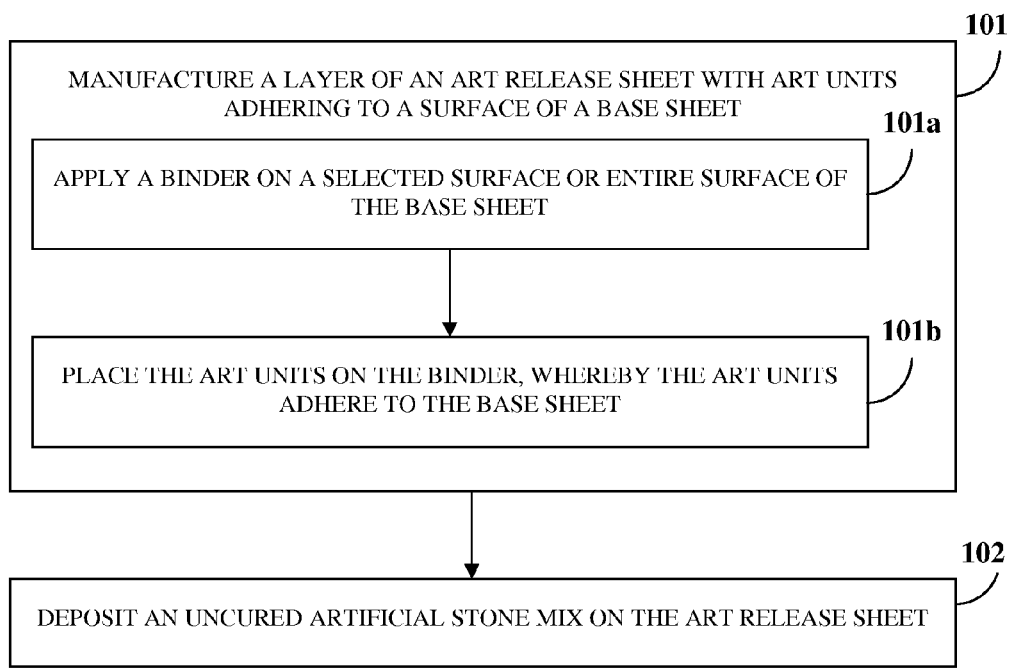
FIG. 1 illustrates a method of manufacturing a decorative surface of a furniture body or a building structure.
Figure 2:
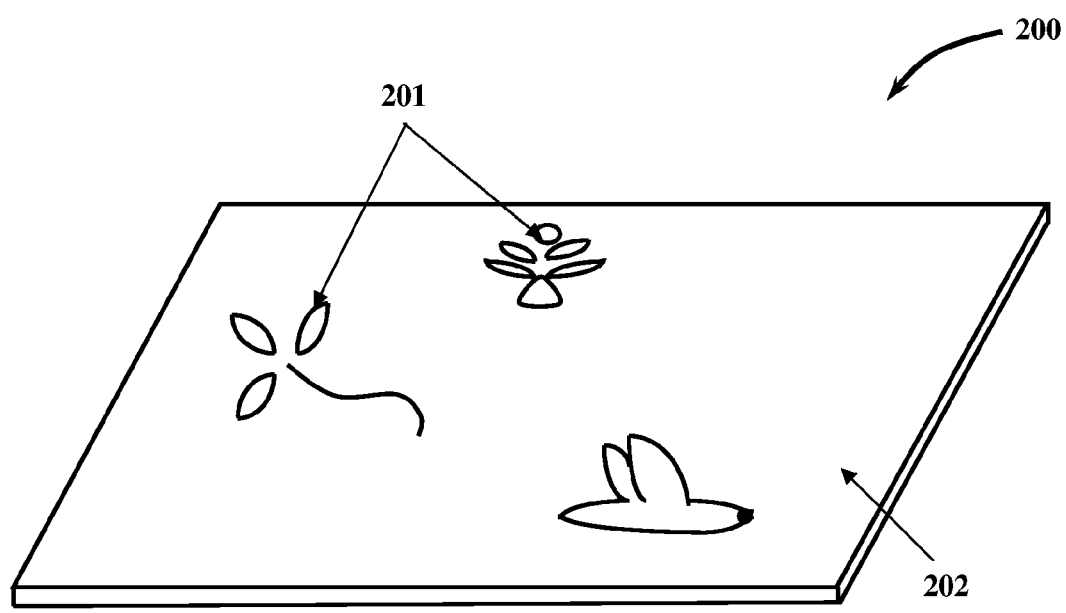
FIG. 2 exemplarily illustrates art units placed on a base sheet to create an art release sheet.

FIG. 1 illustrates a method of manufacturing a decorative surface of a furniture body or a building structure. A layer of an art release sheet is manufactured 101 with multiple art units adhering to a surface of a base sheet. The art release sheet is manufactured by applying 101*a* a binder on a selected surface or entire surface of the base sheet, and placing 101*b* the art units on the binder whereby the art units adhere to the base sheet. The art release sheet is transported to a work bench without dislodging the art units from the base sheet. An uncured artificial stone mix is deposited 102 on the art release sheet and allowed to cure partially or fully. The art units get embedded in the cured artificial stone mix, whereby the decorative surface is manufactured. The base sheet of the art release sheet is removed and the fully cured artificial stone mix is then polished.

FIGS. 2-6 exemplarily illustrate the manufacture of the furniture body 600. The art release sheet 200 is manufactured with multiple art units 201 adhering to a surface of a base sheet 202 as exemplarily illustrated in FIG. 2. Examples of the base sheet 202 are a plastic sheet such as a polyethylene terephthalate (PTFE) sheet, a rubber sheet such as a silicone rubber sheet, a paper sheet such as a newsprint paper sheet, and a metal foil such as an aluminum foil. The art units 201 are placed on the binder, whereby the art units 201 adhere to the base sheet 202. The art units 201 are, for example, one or more of ornamental glass, semiprecious stones, metal art, colored quartz, glass jewelry, and stone jewelry. The binder is, for example, polyvinyl alcohol. The binder may be dried at room temperature or at an elevated temperature. The art release sheet 200 is transported to a work bench without dislodging the art units 201 from the base sheet 202.

Figure 3:
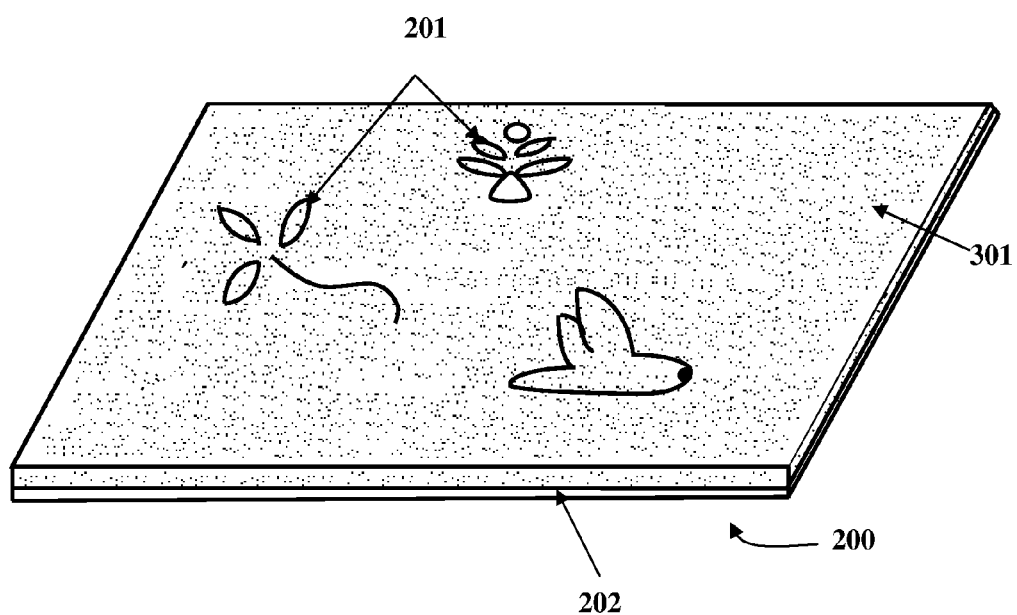
FIG. 3 exemplarily illustrates an uncured artificial stone mix deposited on the art release sheet.
Figure 4:
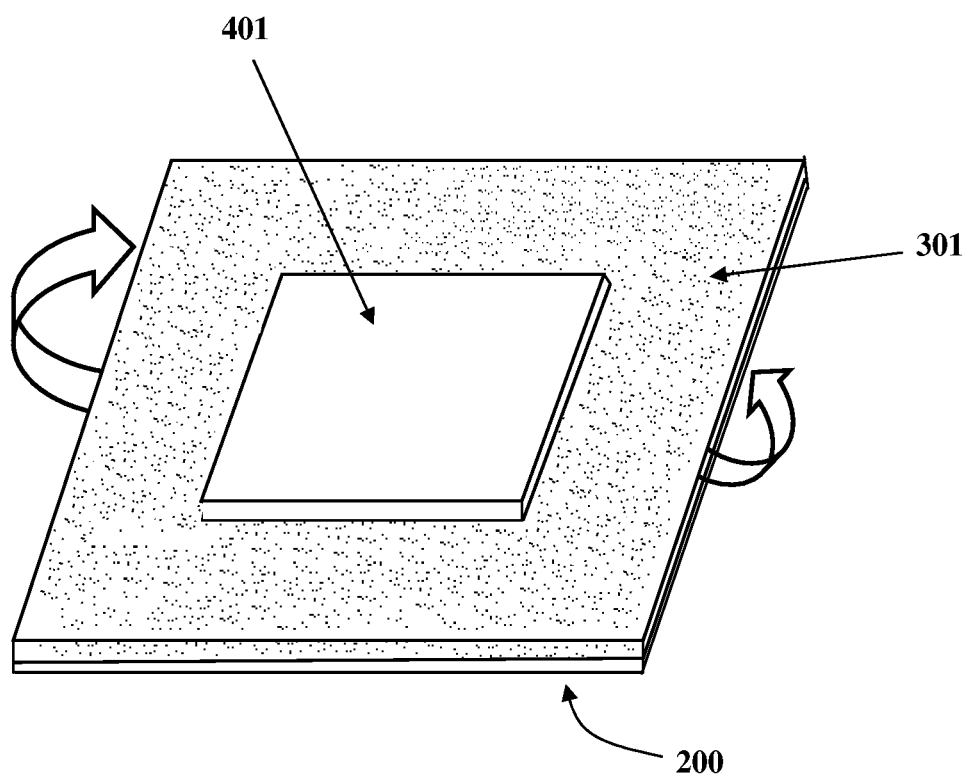
FIG. 4 exemplarily illustrates the process of wrapping the art release sheet deposited with the uncured artificial stone mix over a central core.
Figure 5:
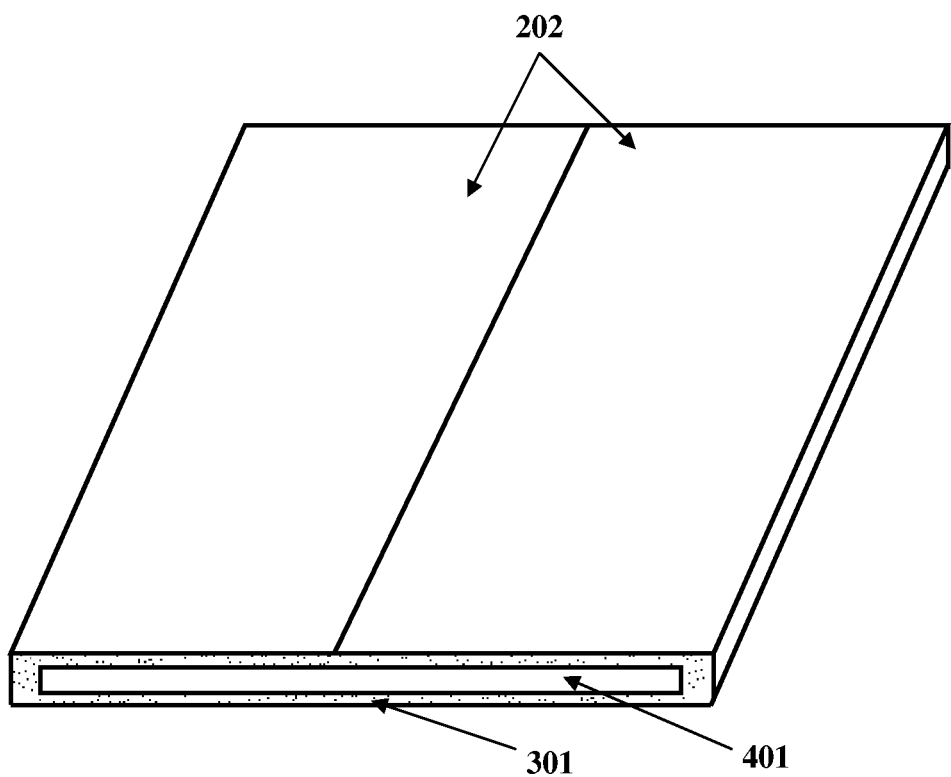
FIG. 5 exemplarily illustrates the central core wrapped with the art release sheet deposited with the uncured artificial stone mix.
Figure 6:
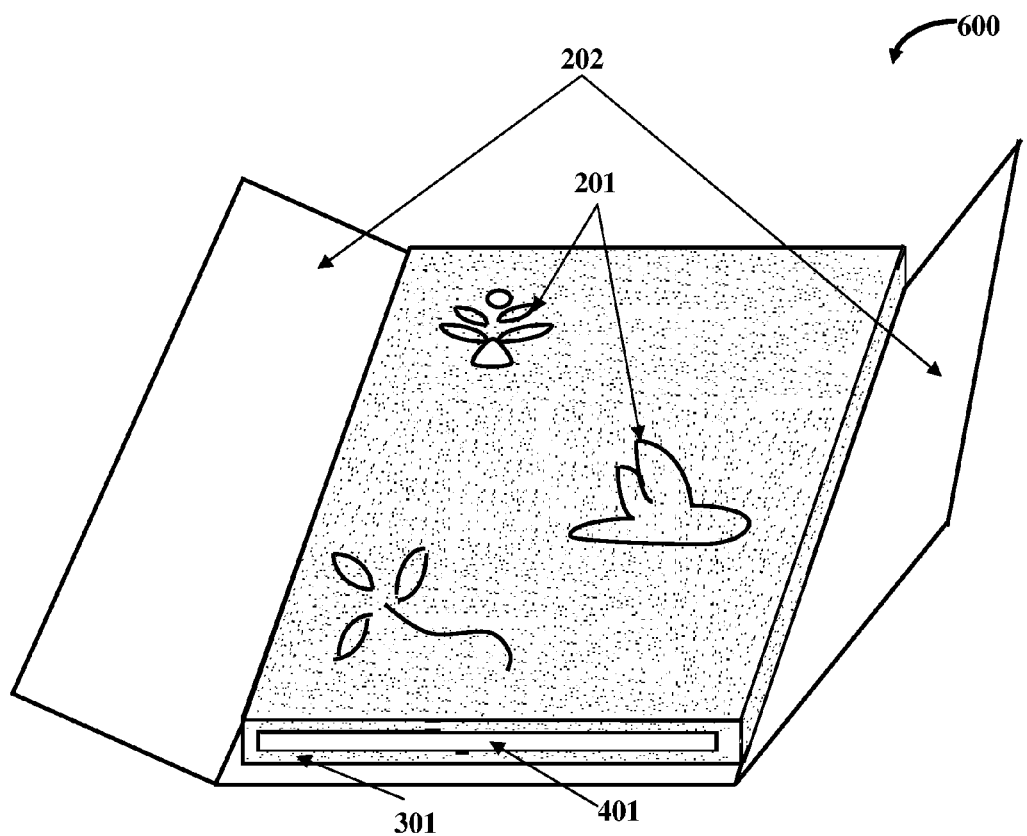
FIG. 6 exemplarily illustrates the process of removing the base sheet after partial or full curing of the artificial stone mix, whereby the art units are embedded in the partial or fully cured artificial stone mix.

An uncured artificial stone mix 301 is deposited on the art release sheet 200, as exemplarily illustrated in FIG. 3, and compacted. A central core 401 is placed on the compacted artificial stone mix 301, as exemplarily illustrated in FIG. 4. The surface of the central core 401 comprises one or more of a planar surface, a curved surface, an uneven surface, a non uniform surface, and a combination thereof. The art release sheet 200 deposited with the uncured artificial stone mix 301 is wrapped around the central core 401, as exemplarily illustrated in FIG. 5 whereby a contiguous piece of art work is created on more than one face of the furniture body 600 or building structure. The contiguous piece of art work extends from one face of the furniture body 600 or building structure to one or more of another surface of the furniture body 600 or building structure. The artificial stone mix 301 is allowed to partially or fully cure and the base sheet 202 is removed. The strength of adhesion between the partially cured or the fully cured artificial stone mix 301 and the art units 201 is greater than the strength of adhesion between the art units 201 and the base sheet 202. The base sheet 202 is removed as exemplarily illustrated in FIG. 6 to create a decorative surface of the furniture body 600 or the building structure.

In an embodiment, the base sheet 202 may be a cellulosic paper based sheet. In case paper is used, the base sheet 202 may be retained after the deposition of the artificial stone mix 301. The paper layer is abraded and removed during the final surface polishing of the cured artificial stone mix 301. If the base sheet 202 is a plastic sheet, the base sheet 202 is released from the cured artificial stone mix 301.

The artificial stone mix 301 further comprises particulates and resin. The particulates are composed of quartz, or composed of one or more of quartz, granite, glass, ceramic, etc. The size of particulates may vary from a fine powder to about 4 mm. The size distribution may follow Fuller's formula to achieve maximum compaction. The resin is, for example, a polyester resin. An example of a polyester resin is a combination of about 80% of an unsaturated polyester resin such as ortho neo pentyl glycol and about 20% of styrene monomer. Another example of a polyester resin is a combination of ortho neo pentyl glycol, methyl acrylate, and styrene monomer. Room temperature catalysts, for example, methyl ethyl ketone peroxide (MEKP) and room temperature accelerators, for example, cobalt naphthenate may be used for curing the resin. In another embodiment, high temperature setting catalysts, for example, dimethyl aniline (DMA) may be used for curing the resin. The artificial stone mix 301 may also be a cement based mix.

Examples 1, 2 and 3 are example compositions of an artificial stone mix 301.

Example 1

| Ingredient | Parts by weight |
| --- | --- |
| Unsaturated polyester resin solution (Unsaturated polyester resin, styrene monomer, methyl methacrylate monomer) | 13 |
| Quartz (particles size <4.0 mm) | 84 |
| Benzoyl peroxide | 1.5 |
| Dimethyl Aniline (DMA) | 1.5 |

Curing was carried out at 70 deg C. for 15 minutes

Example 2

| Ingredient | Parts By Weight |
|---|---|
| Unsaturated polyester resin solution (Unsaturated polyester resin, styrene monomer, methyl methacrylate monomer) | 12 |
| Quartz (particles size <4.0 mm) | 85 |
| Benzoyl peroxide | 1.5 |
| Dimethyl Aniline (DMA) | 1.5 |

Curing was carried out at 70 deg C. for 15 minutes

Example 3

| Ingredient | Parts By Weight |
|---|---|
| Unsaturated polyester resin solution (Unsaturated polyester resin, styrene monomer, methyl methacrylate monomer) | 10 |
| Quartz (particles size <4.0 mm) | 89 |
| Benzoyl peroxide | 0.5 |
| Dimethyl Aniline (DMA) | 0.5 |

Curing was carried out at room temperature.

Example 4

Figure 10A:
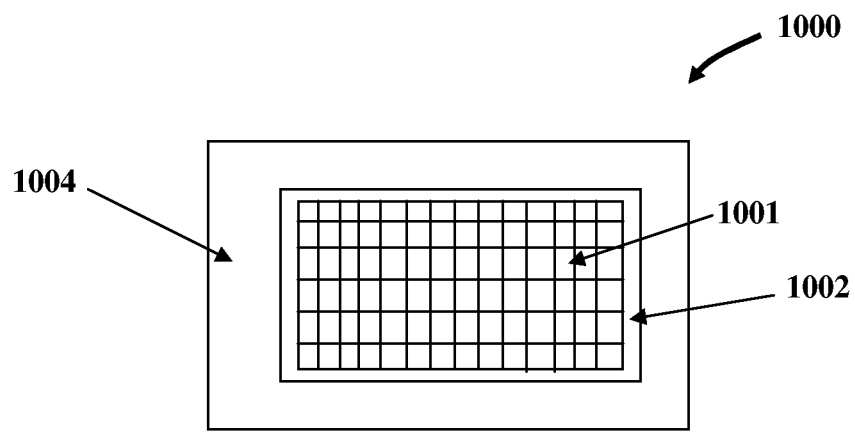
FIG. 10B exemplarily illustrates a side view of the art deposit frame.
Figure 10B:
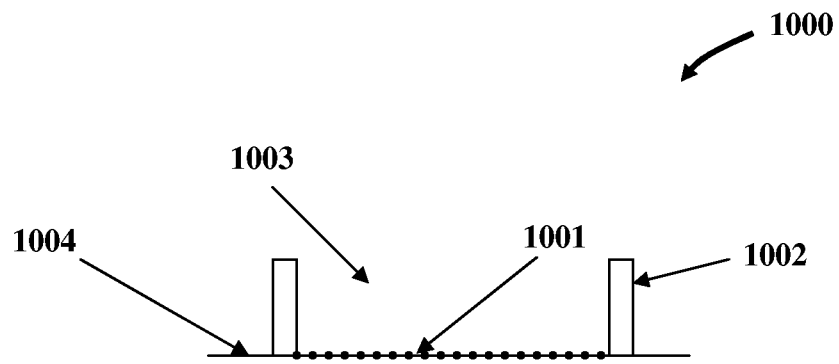

This example illustrates the manufacture of a furniture body 600, for example, a table top. A base release layer, polyvinyl alcohol (PVA) is coated on a surface. An art deposit frame 1000 as exemplarily illustrated in FIGS. 10A-10B is loaded with a predetermined quantity of art particles 1101 such as colored glass particles. The art deposit frame 1000 is placed on the release layer and vibrated whereby the art particles 1101 drop on the release layer. The art deposit frame 1000 is removed leaving behind an art unit 201 on the release layer. The artificial stone mix 301 having the composition of example 3 is deposited on and around the art work. The thickness of the layer of deposit of the artificial stone mix 301 ranges from about 2 mm to about 25 mm. A polyethylene terephthalate sheet is placed over the deposited artificial stone mix 301 and rolled with a heavy roller to compact the artificial stone mix 301. The polyethylene terephthalate sheet is removed and a layer of glass fiber is deposited on the compacted artificial stone mix 301. The glass fiber layer is wetted with an unsaturated polyester resin containing a catalyst such as methyl ethyl ketone peroxide (MEKP) and an accelerator such as cobalt naphthenate. A central core 401 such as structural polyurethane foam, is placed on the resin coated glass fiber layer. The polyethylene terephthalate sheet along with the compacted artificial stone mix 301 and the coated glass fiber layer is wrapped over the structural polyurethane foam on all sides. The lines of contact from the wrapping process are made planar by rolling with a hand held light weight roller. The artificial stone mix 301 is allowed to cure over a period of 48 hours at room temperature. The polyethylene terephthalate sheet is removed from the cured artificial stone mix 301. The cured artificial stone mix 301 is polished in several stages using a rotary head polishing machine. Diamond polishing pads from about 60 grit to about 3000 grit are used for polishing. Each grit size is used in a single stage to create a table top.

The artificial stone mix 301 may be subjected to vibro-compaction. Vacuum may also be applied for better compaction and removal of trapped volatiles and air. The compacting pressure may be applied by a heavy roller. Pressure in the range of, for example, 1 kg/cm$^2$ to 10 kg/cm2, may also be applied using a vibrating compactor, wherein the compactor is a hydraulic or a pneumatic compactor.

Finally, the surface of the furniture body 600 is polished by the polishing techniques applied in granite polishing.

In another embodiment, uncured artificial stone mix 301 is compacted and a layer of fiber deposited on the compacted layer and coated with a resin. In yet another embodiment, a metal grid is inserted in the central core 401.

In yet another embodiment, the binder is a wet binder. The binder is, for example polyvinyl alcohol (PVA). Polyvinyl alcohol is herein referred to as PVA. The liquid PVA is applied to the base sheet 202 as a coating. The art units 201 are placed on the PVA coating, and the PVA coating is allowed to dry at room temperature or dried at an elevated temperature to enable the art units 201 to adhere to the base sheet 202. The art units 201 comprise, for example, one or more of ornamental glass, semiprecious stones, metal art, colored quartz, glass or stone jewelry, etc. Examples of the furniture body 600 or building structure include tables, doors, kitchen cabinet faces, flooring etc.

In yet another embodiment, a wet binder such as PVA is applied on the base sheet 202. The art units 201 are placed on the applied wet-binder and the wet binder is dried using a dry blower or a hot air dryer, thereby creating an art release sheet 200 in a much shorter duration of time.

Figure 7:
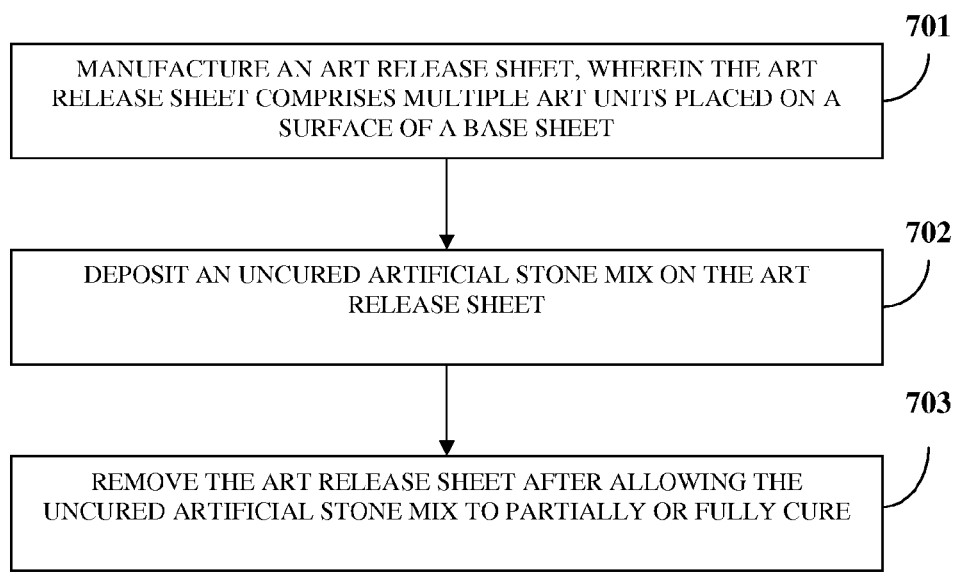
FIG. 7 exemplarily illustrates a method of manufacturing a decorative surface of a furniture body or a building structure FIGS. 8A-8F exemplarily illustrate the process of manufacturing a furniture body or a building structure with a contiguous piece of art work extending from one face of the furniture body or a building structure to another surface of the furniture body or a building structure.
Figure 8A:
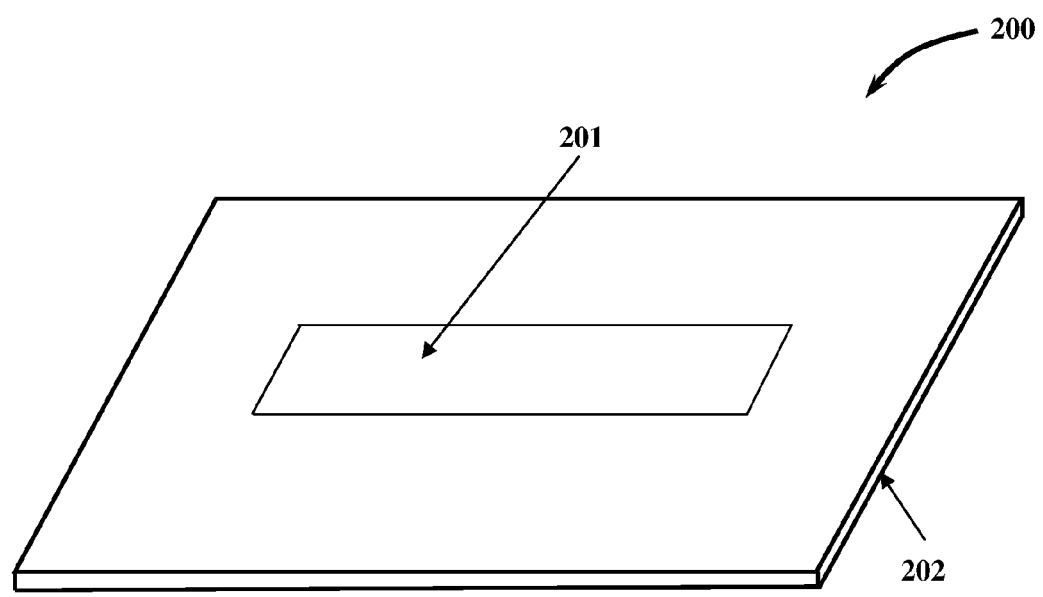
Figure 8B:
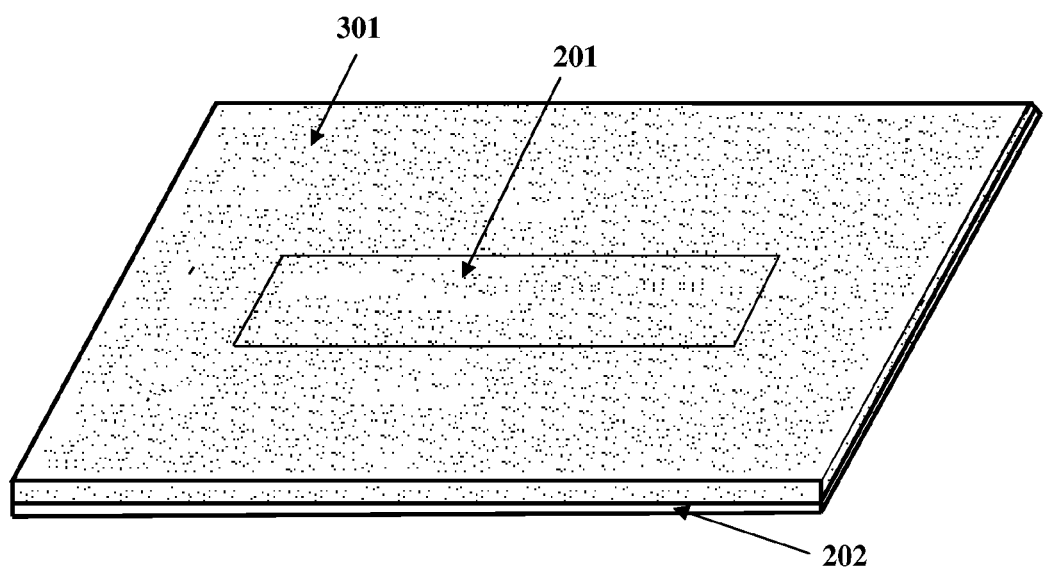
Figure 8C:
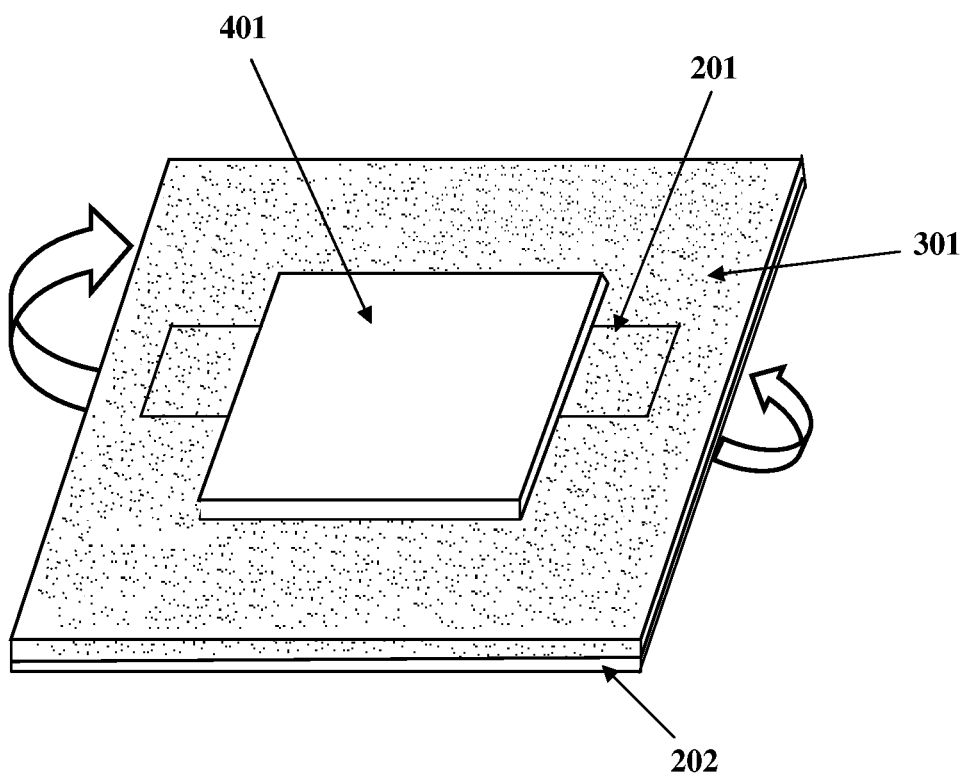
Figure 8D:
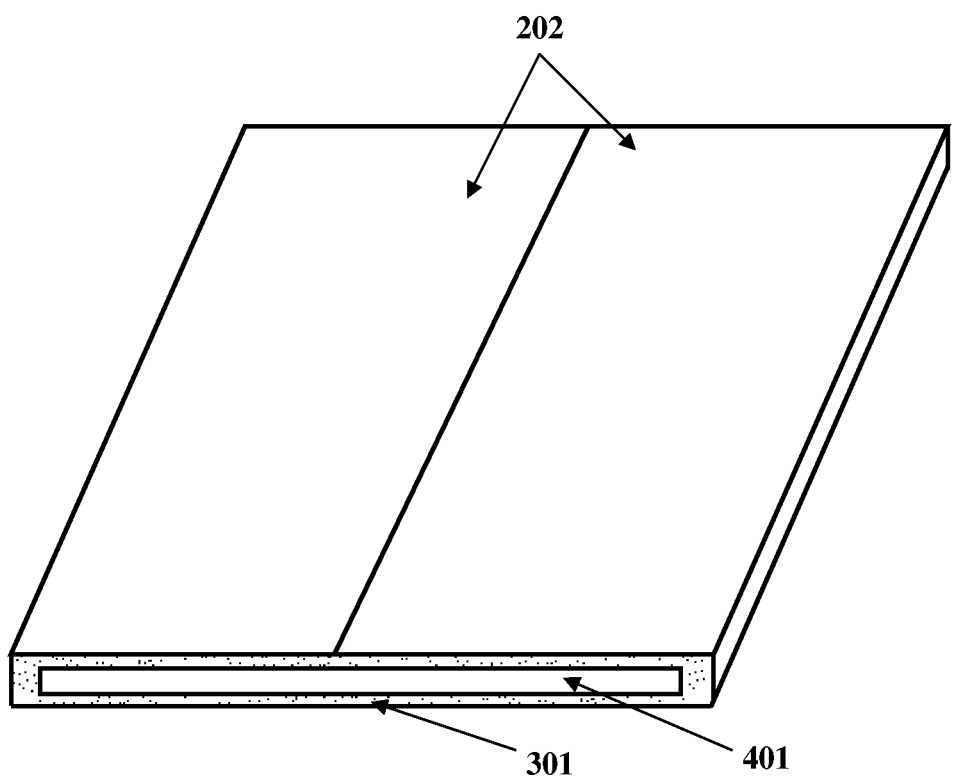
Figure 8E:
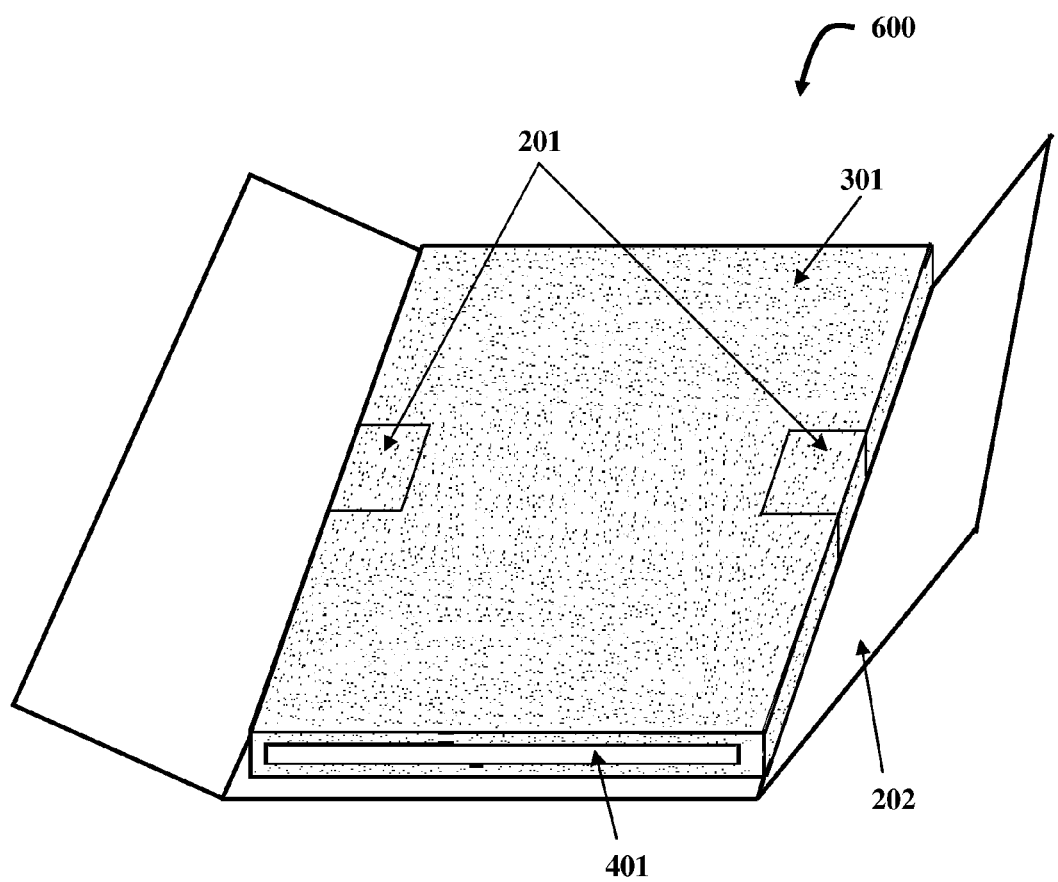
Figure 8F:
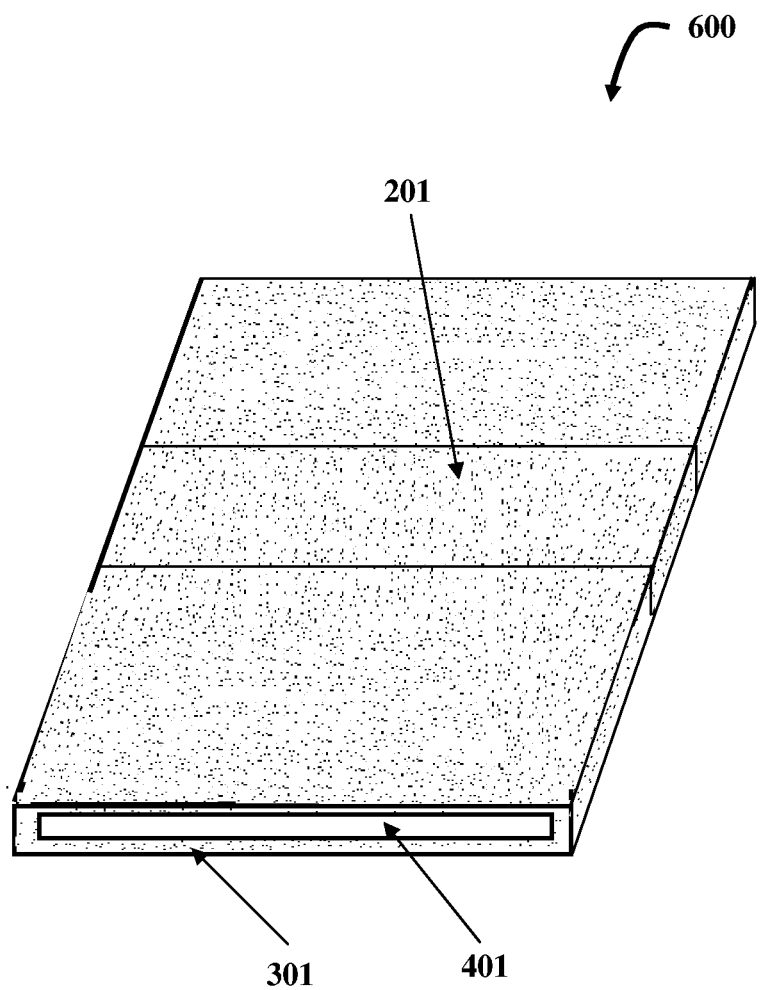

FIG. 7 exemplarily illustrates a method of manufacturing a decorative surface of a furniture body 600 or a building structure. The method disclosed herein comprises: manufacturing 701 an art release sheet 200, wherein the art release sheet 200 comprises multiple art units 201 placed on a surface of a base sheet 202; depositing 702 an uncured artificial stone mix 301 on the art release sheet 200; and removing 703 the base sheet 202 after allowing the artificial stone mix 301 to partially or fully cure. The art units 201 are embedded in the cured artificial stone mix 301 for manufacturing the decorative surface.

FIGS. 8A-8F exemplarily illustrate the process of manufacturing a furniture body 600 or a building structure with a contiguous piece of art work extending from one face of the furniture body 600 or a building structure to another surface of the furniture body 600 or a building structure. In order to manufacture the decorative surface of a furniture body 600, the art release sheet 200 is manufactured. The art release sheet 200 comprises multiple art units 201 placed on a surface of a base sheet 202 as exemplarily illustrated in FIG. 8A. An uncured artificial stone mix 301 is deposited on the art release sheet 200 and compacted as exemplarily illustrated in FIG. 8B. A central core 401 is placed on the artificial stone mix 301 as exemplarily illustrated in FIG. 8C. The art release sheet 200 along with the uncured artificial stone mix 301 is wrapped around the central core 401 to create a contiguous piece of artwork. The wrapped central core 401 is exemplarily illustrated in FIG. 8D. The uncured artificial stone mix 301 is allowed to cure partially or fully. The base sheet 202 of the art release sheet 200 is removed as exemplarily illustrated in FIG. 8E. The contiguous piece of artwork created extends from one face of the furniture body 600 or building structure to another face of the furniture body 600 or building structure as exemplarily illustrated in FIG. 8F. The fully cured artificial stone mix 301 is polished.

Figure 9:
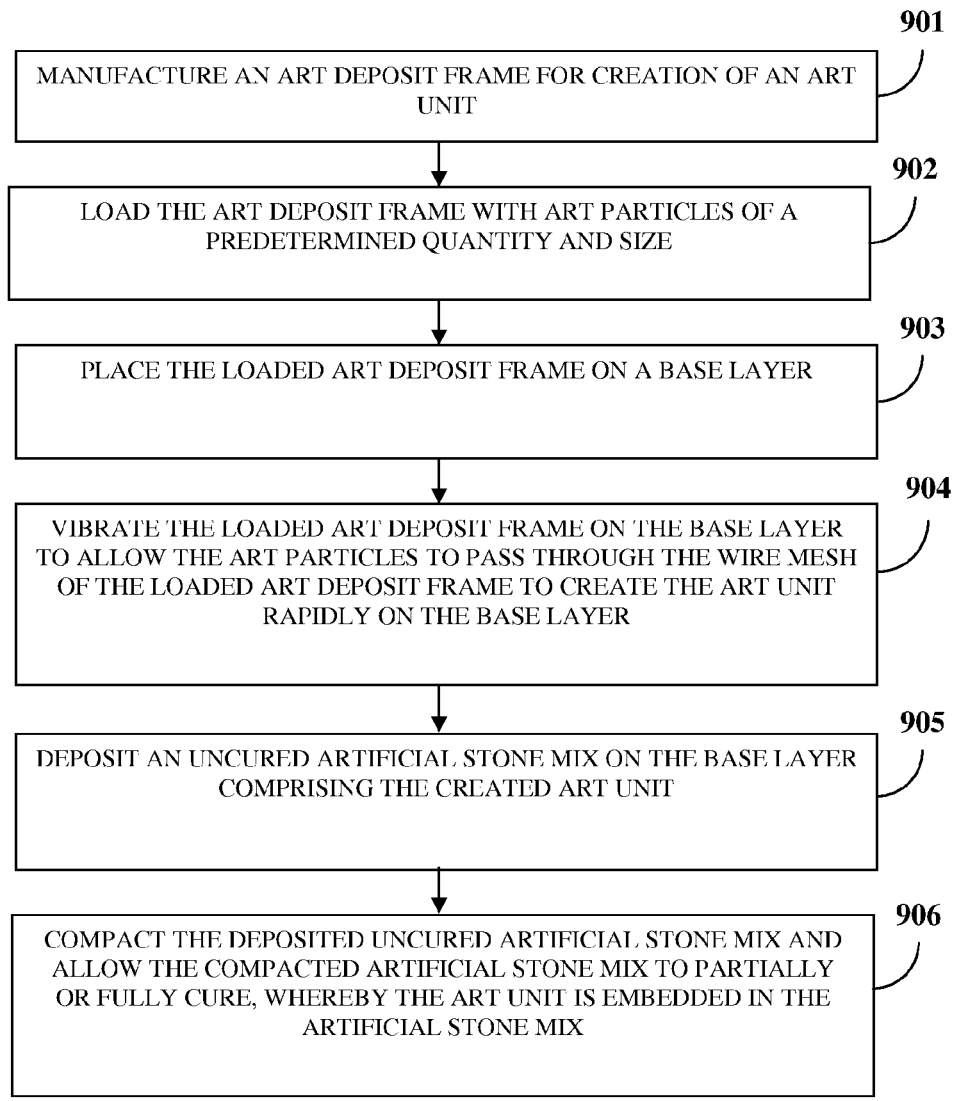
FIG. 9 exemplarily illustrates a method of manufacturing a decorative surface of a furniture body or a building structure FIG. 10A exemplarily illustrates a top view of an art deposit frame used for the creation of an art unit.
Figure 11:
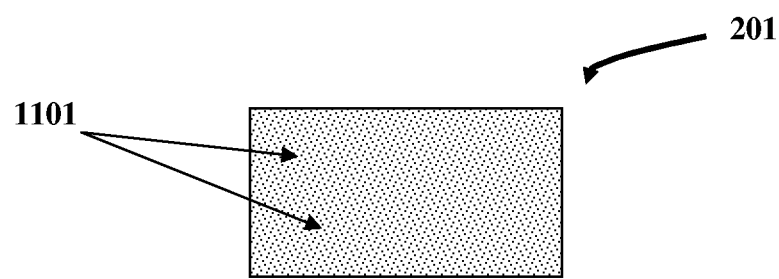
FIG. 11 exemplarily illustrates the art unit created utilizing the art deposit frame.

FIG. 9 exemplarily illustrates a method of manufacturing a decorative surface of a furniture body 600 or a building structure. An art deposit frame 1000 is manufactured 901 for creation of an art unit 201. A top view of an art deposit frame 1000 used for the creation of an art unit 201 is exemplarily illustrated in FIG. 10A. The art deposit frame 1000 comprises a cavity 1003 defined by a continuous sidewall 1002 and a wire mesh 1001 detachably attached to bottom edges of the continuous sidewall 1002 as exemplarily illustrated in FIG. 10B. The continuous sidewall 1002 defines a periphery of the art unit 201. The art deposit frame 1000 is loaded 902 with art particles 1101 of a predetermined quantity and size. The loaded art deposit frame 1000 is placed 903 on a base layer 1004, wherein the base layer 1004 has a surface release property. The loaded art deposit frame 1000 is vibrated 904 on the base layer 1004, thereby allowing the art particles 1101 to pass through the wire mesh 1001 of the art deposit frame 1000 to create the art unit 201 rapidly on the base layer 1004. The art unit 201 created utilizing the art deposit frame 1000 is exemplarily illustrated in FIG. 11. An uncured artificial stone mix 301 is deposited 905 on the base layer 1004 comprising the created art unit 201. The deposited uncured artificial stone mix 301 is compacted 906 and allowed to partially or fully cure, whereby the created art unit 201 is embedded in the artificial stone mix 301 for manufacturing the decorated surface.

A backing of glass fiber is applied on the artificial stone mix 301 and coated with a resin thereby providing improved strength to the furniture body 600. Vibro-compaction or vibro-compaction in vacuum is applied to the artificial stone mix 301, whereby trapped volatiles and air are released.

In yet another embodiment, an art unit template has a cavity with a contour of the shape of the art unit 201. The art unit template is shaped from a material such as a foam and placed on the base sheet 202. The art particles 1101 are deposited in the cavity of the art unit template and vibration is imparted to the art unit template to distribute the art particles 1101 evenly on the surface of the base sheet 202. The vibration causes the deposited art particles 1101 to conform to the contour of the art unit 201 defined by the contour of the art unit template, whereby the art unit 201 is created rapidly.

The foregoing examples have been provided merely for the purpose of explanation and are in no way to be construed as limiting of the invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A method of manufacturing a decorative surface of a furniture body or a building structure, comprising:
   manufacturing a layer of an art release sheet with a plurality of art units adhering to a selected surface of a base sheet, comprising:
      applying a wet binder on said selected surface of said base sheet wherein, said binder comprises polyvinyl alcohol;
      placing said art units on said binder; and
      drying said wet binder with a dry blower to adhere said art units to said base sheet; and
   depositing an uncured artificial stone mix on said art release sheet, wherein said uncured artificial stone mix is allowed to cure partially or fully, wherein said art units are embedded in said partially or fully cured artificial stone mix;
   placing a central core on said art release sheet deposited with said partially or fully cured artificial stone mix, wherein said art release sheet deposited with said partially or fully cured artificial stone mix is wrapped around said central core, wherein a contiguous piece of art work extending from one face of said central core to at least one another face of said central core, and wherein said faces of said central core comprises one or more of a planar surface, a curved surface, an uneven surface, a non uniform surface, and a combination thereof.

2. The method of claim 1, wherein said base sheet is one of a polyethylene terephthalate sheet, a plastic sheet, a rubber sheet, and a polytetrafluoroethylene sheet.

3. The method of claim 1, wherein said art units comprise one or more of ornamental glass, semiprecious stones, metal art, colored quartz, glass jewelry, and stone jewelry.

* * * * *